Patented July 18, 1950

2,515,290

UNITED STATES PATENT OFFICE 2,515,290

COATING COMPOSITIONS

David S. Breslow, Wilmington, Del., assignor to Hercules Powder Company, Wilmington, Del., a corporation of Delaware No Drawing. Application October 30, 1948, Serial No. 57,613

9 Claims. (Cl. 106—253)

This invention relates to new protective coating compositions and more particularly to a cold-blended varnish containing as the resinous material a pentaerythritol ester of a dehydroabietyl N-substituted carbamic acid.

Varnish vehicles are usually prepared by cooking resin and oil to temperatures of about 220° to 320° C. This process is not only time-consuming and expensive but hazardous. In the preparation of cooked vehicles, the batches frequently catch fire during the cooking operation and the addition of inflammable solvent to the hot varnish base is particularly hazardous. Many attempts have been made to avoid these difficulties by cold-blending the resins with the oil. However, such cold-blended or cold-cut varnishes have not been comparable to the cooked varnishes. For the most part they suffer from the disadvantages of low viscosity, poor gloss, and low alkali and water resistance and, consequently, are used in pigmented coatings whereby some of these disadvantages are obscured. One of the most marked disadvantages of the cold-blended varnishes has been their extremely slow drying rate.

Now in accordance with this invention it has been found that a coating composition comprising a pentaerythritol ester of a dehydroabietyl N-substituted carbamic acid and a drying oil may be prepared by cold-blending the pentaerythritol ester of a dehydroabietyl N-substituted carbamate with the drying oil whereby an oleoresinous protective coating is produced which is comparable to the standard resin cooked varnishes and which is, in fact, superior to many of the cooked varnishes.

The following examples will illustrate the preparation of the new coating composition in accordance with this invention. All parts and percentages are by weight unless otherwise indicated.

Example 1

A pentaerythritol ester of dehydroabietyl N-substituted carbamic acid was prepared by heating pentaerythritol and disproportionated rosin isocyanate, in a molar ratio of 1:4, for 24 hours at 200°–210° C. in a stream of nitrogen. The resinous carbamate so produced had a Lovibond color of 10 Amber, a drop softening point of 148.5° C. and contained 0.25% hydroxyl and 0.25% isocyanate.

A solution of equal parts of mineral spirits and the above pentaerythritol dehydroabietyl N-substituted carbamate resin was prepared at room temperature using a tumbler to aid the dissolution of the resin. Cobalt naphthenate (6% cobalt metal) was added to $Z_3$ bodied linseed oil in an amount to give a proportion of 0.1 part of cobalt metal to 100 parts of linseed oil. Twenty parts of the resin solution were then added, at room temperature, to 16 parts of the oil to make a 20-gal. oil length vehicle. This varnish was then thinned to 58 parts varnish solids by the addition of mineral spirits. It had a viscosity of 100 cps. and a color of 6 on the Gardner scale. A 5-mil wet film of this varnish dried aluminum foil free in 7½ hours. In comparison, a film of a 20-gal. cooked $Z_3$ linseed oil-pentaerythritol rosin ester varnish was not aluminum foil free after drying 8½ hours and a 20-gal. cold-blended $Z_3$ linseed oil-pentaerythritol rosin ester varnish was soft and slightly tacky even after drying 24 hours. The pentaerythritol dehydroabietyl carbamate resin varnish film, when exposed to 1% aqueous sodium hydroxide solution, did not show any discoloration for 4½ hours whereas the cooked pentaerythritol rosin ester varnish film discolored after 1 hour and the cold-blended pentaerythritol rosin ester varnish film discolored in 20 minutes.

Example 2

A pigment paste was prepared by grinding 24 parts of bodied linseed oil and 39 parts of titanium dioxide in a buhrstone mill. Ninety-six parts of a 50% solution of pentaerythritol dehydroabietyl carbamate resin in mineral spirits was added at room temperature to 200 parts of this pigment paste to form a 20-gal. oil length vehicle containing equal parts of varnish solids and pigment. Cobalt naphthenate was added to give 0.1% cobalt by weight based on the linseed oil. This enamel was thinned with mineral spirits to give a final composition of 33.6% pigment, 33.6% varnish solids and 32.8% mineral spirits. It dried in 8 hours and had good gloss, color, and adhesion. It had a better color and gloss and dried faster than a comparison enamel prepared from a cooked 20-gal. linseed oil-maleic-modified pentaerythritol rosin ester vehicle.

Example 3

Zinc oxide livering tests were made comparing a 20-gal. linseed oil-pentaerythritol dehydroabietyl carbamate varnish, prepared as described in Example 1 except that no drier was added, with a similarly prepared varnish using a maleic-modified pentaerythritol rosin ester and with a conventional cooked varnish prepared from the latter resin. The zinc oxide and varnish, at a 1 part zinc oxide to 1 part varnish solids ratio, were ground 3 passes in a three-roll steel mill. The viscosity, as determined by the Krebs Fork method, was measured after grinding and again after 24, 48 and 96 hours storage at 25° C. with the following results.

|  | Kreb Unit Viscosity at 25° C. | | | |
|---|---|---|---|---|
|  | Initial | 24-hour | 48-hour | 96-hour |
| cold-blended pentaerythritol-dehydroabietyl carbamate varnish | 71 | 76 | 71 | 78 |
| cold-blended maleic-modified pentaerythritol ester of rosin varnish | 71 | 84 | 104 | 114 |
| cooked maleic-modified pentaerythritol ester of rosin varnish | 57 | 62 | 112 | 126 |

*Examples 4–8*

Varnishes having the following formulations were prepared by the method described in Example 1, the indicated drying oils and naphthenate driers being substituted for the linseed oil and cobalt naphthenate used in that example.

| Example | Oil | Oil Length | Naphthenate drier percent oil weight | Percent Mineral Spirits by weight | Aluminum foil free drying time, hours |
|---|---|---|---|---|---|
| 4 | dehydrated castor oil | 12.5 | 0.05% Co 0.4% Pb | 46 | 3 |
| 5 | styrene-modified soybean oil | 20 | 0.1% Co 0.8% Pb | 52 | 2⅔ |
| 6 | heat-bodied soybean oil | 20 | 0.1% Co 0.8% Pb | 55 | 7 |
| 7 | copolymer-type linseed and soybean oil | 20 | 0.1% Co 0.8% Pb | 35 | 2⅔ |
| 8 | bodied linseed oil | 25 | 0.1% Co 0.8% Pb | 41 | 8½ |

All of these varnishes were resistant to alkali, those of Examples 4 and 5 being only slight affected after 72 hours' exposure to a 3% sodium hydroxide solution.

The coating compositions of this invention contain as the resinous ingredient a pentaerythritol ester of dehydroabietyl N-substituted carbamic acid. This carbamate resin is unique in that it may be cold-cut into a film-forming ingredient to produce exceptional coating compositions. When cold-cut into any of the usual drying oils, varnishes are produced which are comparable or superior to cooked varnishes. These coating compositions containing the pentaerythritol dehydroabietyl carbamate resin and drying oil may be modified by any of the usual procedures known to the paint and varnish industry as, for example, the addition of thinners, driers, pigments, etc.

The new coating compositions of this invention may be prepared by any of the usual techniques of cold-blending the resin and oil. If desired, the resin and oil may be heated up to temperatures of about 100° C. in order to assist in the dissolution of the resin, but, as may be seen from the foregoing examples, the resin and oil are easily blended at ordinary room temperatures. The simplest method of cold-blending the resin and drying oil is to add a solution of the resin to the drying oil. Any of the usual thinners or solvents may be used for preparing the resin solution which is added to the oil. The resin may be dissolved directly in the oil.

Any drying or semidrying oil may be used as the film-forming ingredient of the coating compositions of this invention. Examples of the common oils which may be used in combination with the pentaerythritol dehydroabietyl carbamate resin are linseed oil, tung oil, dehydrated castor oil, soya oil, fish oil, sunflower seed oil, rapeseed oil, perilla oil, oiticica oil, hempseed oil, etc. The oils may be blown, heat polymerized, cata- lytically polymerized or copolymerized, if desired. The amount of drying oil mixed with the resin will, of course, depend upon the type of coating composition desired. In general, the oil length may be varied from a very short oil length, as, for example, 5-gal. per 100 lbs. of resin, to a long oil length of about 80-gal. The preferred oil length is usually from about 10 to 30-gal. As pointed out above, either bodied or unbodied oils may be used. However, the heat-bodied oils are usually desirable since higher viscosity vehicles are obtained with them.

While mineral spirits were used as the diluent in the foregoing examples, any of the usual thinners may be employed. Any volatile organic solvent may be used as, for example, the volatile petroleum hydrocarbons, benzene, toluene, xylene, naphtha, cyclohexane, etc. The amount of solvent added will depend upon the type of finished product desired as, for example, brush paints, spray paints, etc. In general an amount of solvent is added which will yield a free-flowing mixture capable of application in a thin film.

The coating compositions of this invention may also contain the generally employed drying catalysts. In the foregoing examples, naphthenate salts of the drier metals were used, but any of the reactive soluble salts, such as the linoleates and resinates, of such metals as cobalt, lead, calcium, magnesium, zinc, etc., will act as catalysts in the drying process. Any combination of these driers may be used and they are employed in the proportions normally used. The coating compositions may be pigmented with reactive or nonreactive pigments to provide enamel compositions. These pigments may be ground into the oil prior to blending with the resin or they may be ground into the thinned varnish.

The pentaerythritol dehydroabietyl carbamate which is used as the resinous ingredient of the coating compositions of this invention may be prepared by reacting the isocyanate of dehydrogenated or disproportionated rosin with pentaerythritol and consequently is a pentaerythritol ester of a dehydroabietyl N-substituted carbamic acid. The pentaerythritol may be reacted with either a pure dehydroabietyl isocyanate or the isocyanate of disproportionated or dehydrogenated rosin. As used in this specification and the claims appended hereto, the term "dehydroabietyl N-substituted carbamic acid" is meant to include not only the product obtainable from the isocyanate of pure dehydroabietic acid but also that from the isocyanate of a commercial dehydrogenated or disproportionated rosin.

The rosin isocyanate from which the carbamate resin is prepared is readily obtained by reacting the amine of dehydrogenated or disproportionated rosin or the hydrohalide salt thereof with phosgene. As pointed out above, instead of using the commercial product, pure dehydroabietyl amine may be used if desired. The isocyanate is most easily prepared by passing phosgene into a solution of the amine or hydrohalide salt thereof in an inert solvent at a temperature of from about 50° C. to about 200° C. The isocyanate may then be separated from the reaction mixture by removal of the solvent and, if desired, may be purified by distillation.

The reaction between the dehydrogenated rosin isocyanate and the pentaerythritol is readily brought about by heating the two reactants together in the presence or absence of a solvent which is inert under the reaction conditions. However, the reaction is easily carried out in the absence of a solvent by heating the two reactants to a temperature above the softening point of the resin. In general, temperatures of from about 60° C. (when a solvent is used) up to about 250° C. may be used for the reaction.

The pentaerythritol which is reacted with the rosin isocyanate may be either pure pentaerythritol or a technical pentaerythritol or may be a mixture of pentaerythritol and polypentaerythritol. One or all of the hydroxyls of the pentaerythritol may be esterified by reaction with the isocyanate. Thus, the molar ratio of pentaerythritol to isocyanate may vary from 1:1 to 1:4. The latter is usually preferred since the resin obtained has a higher softening point than those in which only part of the hydroxyls are reacted.

The new protective coating compositions of this invention have many advantageous properties. The preparation of a cold-cut varnish having properties comparable to cooked varnishes is particularly outstanding. Many resins have a limited compatibility with varnish-type oils and are made compatible only by cooking or if compatible at low temperatures do not impart sufficient viscosity to allow the use of considerable amounts of the relatively inexpensive thinners. The pentaerythritol dehydroabietyl carbamate, however, is compatible with varnish-type oils including both bodied and modified oils and imparts sufficient viscosity to allow the use of thinners in the large amounts normally used for cooked varnishes. In the past, cold-blended varnish vehicles have not been acceptable protective coatings in comparison with cooked varnish vehicles. One of the most marked disadvantages of the prior art cold-blended varnishes has been their extremely slow dry. In comparison, the cold-blended varnish vehicles of this invention dry very rapidly and are, in many cases, as shown in Example 1, superior to conventional cooked varnishes. Many cold-blended varnishes tend to sag when wet and thus when dry leave an uneven surface, whereas the cold-blended varnishes of this invention do not sag. In addition, these cold-blended varnishes have excellent alkali and water resistance properties, which are lacking in other cold-cut varnishes. Most cold-blended and cooked varnishes are reactive with pigments and tend to after body or liver on storage. The varnishes prepared from the pentaerythritol dehydroabietyl carbamate resin are free of this undesirable reactivity and consequently do not liver on storage.

The coating compositions of this invention may be applied to various surfaces, such as wood, metal, and the like, by any of the usual methods as, for example, by brushing, spraying, dipping, etc. The films formed on evaporation of the volatile ingredients have, in addition to the superior properties mentioned above, excellent adherence to the surface.

What I claim and desire to protect by Letters Patent is:

1. A coating composition comprising a pentaerythritol ester of a dehydroabietyl N-substituted carbamic acid and a drying oil.

2. A coating composition comprising a pentaerythritol ester of a dehydroabietyl N-substituted carbamic acid, a drying oil and a solvent.

3. A cold-blended varnish comprising a pentaerythritol ester of a dehydroabietyl N-substituted carbamic acid and a drying oil.

4. A cold-blended varnish comprising a pentaerythritol ester of a dehydroabietyl N-stubstituted carbamic acid, a drying oil and a solvent.

5. A cold-blended varnish comprising a drying oil and as a resinous ingredient a pentaerythritol ester of a dehydroabietyl N-substituted carbamic acid in which all of the hydroxyl groups of the pentaerythritol have been esterified by the carbamic acid.

6. An enamel comprising a pentaerythritol ester of a dehydroabietyl N-substituted carbamic acid, a drying oil, a pigment, and a solvent.

7. A cold-blended varnish comprising a pentaerythritol ester of a dehydroabietyl N-substituted carbamic acid, linseed oil and a solvent.

8. A cold-blended varnish comprising a pentaerythritol ester of a dehydroabietyl N-substituted carbamic acid, dehydrated castor oil and a solvent.

9. A cold-blended varnish comprising linseed oil and as a resinous ingredient a pentaerythritol ester of a dehydroabietyl N-substituted carbamic acid in which all of the hydroxyl groups of the pentaerythritol have been esterified by the carbamic acid.

DAVID S. BRESLOW.

REFERENCES CITED

The following references are of record in the file of this patent:

UNITED STATES PATENTS

| Number | Name | Date |
| --- | --- | --- |
| 2,066,759 | Bent | Jan. 5, 1937 |